United States Patent
Kirk et al.

(10) Patent No.: US 9,047,342 B2
(45) Date of Patent: Jun. 2, 2015

(54) METHOD FOR ACCELERATING QUERIES CONTAINING LOCAL RANGE CONDITIONS USING SUBTRACTION OF CUMULATIVE BITMAPS

(75) Inventors: Steve Kirk, Chelmsford, MA (US); Neil Burkhard, Concord, MA (US)

(73) Assignee: SYBASE, INC., Dublin, CA (US)

( * ) Notice: Subject to any disclaimer, the term of this patent is extended or adjusted under 35 U.S.C. 154(b) by 890 days.

(21) Appl. No.: 12/342,756

(22) Filed: Dec. 23, 2008

(65) Prior Publication Data

US 2009/0171916 A1   Jul. 2, 2009

Related U.S. Application Data

(60) Provisional application No. 61/017,410, filed on Dec. 28, 2007.

(51) Int. Cl.
 *G06F 7/00* (2006.01)
 *G06F 17/30* (2006.01)
(52) U.S. Cl.
 CPC .............................. *G06F 17/30483* (2013.01)
(58) Field of Classification Search
 CPC ................... G06F 17/30324; G06F 17/30495; G06F 17/30501
 USPC .................................. 707/713, 745, 758, 769
 See application file for complete search history.

(56) References Cited

U.S. PATENT DOCUMENTS

| | | | | |
|---|---|---|---|---|
| 5,560,007 A * | 9/1996 | Thai | | 1/1 |
| 5,761,652 A * | 6/1998 | Wu et al. | | 1/1 |
| 5,819,256 A * | 10/1998 | Ozbutun et al. | | 1/1 |
| 5,963,642 A * | 10/1999 | Goldstein | | 713/193 |
| 6,141,656 A * | 10/2000 | Ozbutun et al. | | 1/1 |
| 6,490,578 B1 * | 12/2002 | Burkhard | | 1/1 |
| 2005/0216518 A1 * | 9/2005 | Hu et al. | | 707/200 |
| 2007/0050381 A1 * | 3/2007 | Hu et al. | | 707/100 |

OTHER PUBLICATIONS

Chan, Chee-Yong, et al., "Bitmap Index Design and Evaluation", ACM SIGMOD Record, vol. 27, Issue 2 (Jun. 1998), pp. 355-366.
Chan, Chee-Yong et al., "An Efficient Bitmap Encoding Scheme for Selection Queries", International Conference on Management of Data Proceedings of the 1999 ACM SIGMOD International Conference on Management of Data, 1999, pp. 215-226.

* cited by examiner

*Primary Examiner* — Cheyne D Ly
(74) *Attorney, Agent, or Firm* — Sterne, Kessler, Goldstein & Fox P.L.L.C.

(57) ABSTRACT

A system, method, and computer program product are provided for optimizing a range-based query on a table in a database system.

16 Claims, 9 Drawing Sheets

| Row # | | Column of Interest 618 | 616 |
|---|---|---|---|
| 0 | • • • | 27 | • • • |
| 1 | • • • | 4 | • • • |
| 2 | • • • | 7 | • • • |
| 3 | • • • | 9 | • • • |
| 4 | • • • | 13 | • • • |
| 5 | • • • | 6 | • • • |
| 6 | • • • | 18 | • • • |
| 7 | • • • | 23 | • • • |
| 8 | • • • | 8 | • • • |
| 9 | • • • | 11 | • • • |

| Row # | | Column of Interest 618 | | 616 |
|---|---|---|---|---|
| 0 | • • • | 27 | • • • | |
| 1 | • • • | 4 | • • • | |
| 2 | • • • | 7 | • • • | |
| 3 | • • • | 9 | • • • | |
| 4 | • • • | 13 | • • • | |
| 5 | • • • | 6 | • • • | |
| 6 | • • • | 18 | • • • | |
| 7 | • • • | 23 | • • • | |
| 8 | • • • | 8 | • • • | |
| 9 | • • • | 11 | • • • | |

METHOD FOR ACCELERATING QUERIES CONTAINING LOCAL RANGE CONDITIONS USING SUBTRACTION OF CUMULATIVE BITMAPS

RELATED APPLICATIONS

The present application claims the benefit of U.S. Provisional Patent Application No. 61/017,410, filed Dec. 28, 2007, entitled METHOD FOR ACCELERATING QUERIES CONTAINING LOCAL RANGE CONDITIONS USING SUBTRACTION OF CUMULATIVE BITMAPS, which is incorporated herein by reference in its entirety.

The present application is related to commonly-owned U.S. Pat. No. 6,490,578, filed Sep. 28, 2000, issued Dec. 3, 2002, entitled DATABASE SYSTEM WITH METHODOLOGY FOR HIGH-PERFORMANCE DATE, which is a non-provisional of U.S. Provisional Application No. 60/194,853, filed Apr. 5, 2000, which are incorporated herein by reference in their entireties.

BACKGROUND OF INVENTION

1. Field of the Invention

The present invention relates generally to databases and, more particularly, to query optimization in a database.

2. Description of the Background Art

Databases commonly organize data in the form of tables, each table having a number of rows and columns. Each row in a table generally has a data value associated with each of the columns, this intersection of rows and columns commonly called a cell. A system needing access to data in the database typically issues a request in the form of a query. A query usually involves a request for the data contained in one or more cells of any rows which meet a particular condition. This condition often involves the comparison of the values of cells in a column to some other value to determine whether the row associated with the compared cell meets the condition.

A direct comparison of each cell of interest in a table to a value is often computationally expensive, and database developers have accordingly introduced means by which rows meeting a comparison operation can be more readily determined without the need to traverse every row of a table. A typical optimization involves the use of a tree structure to determine which rows contain a desired value. Each node of the tree represents a different value appearing within a particular column in any row of the table. Each node comprises a bitmap indicating that particular rows corresponding to each bit of the bitmap have the value in the particular column.

This approach is reasonably efficient when an exact value is desired, such as with, for example, a query for all rows in which a particular column has the integer value '5'. In this approach, database software would traverse the tree structure to locate the node corresponding to the integer value of '5' and retrieve an associated bitmap. The rows for which the value of the particular column is '5' would be represented by "set" bits in the bitmap (i.e., bits set to either a '0' or a '1' value in order to indicate that a corresponding row meets the condition). As a result, the database software is able to simply retrieve those rows and produce a result set from them.

However, this approach does not provide an optimal solution for more complex operations. For example, it is sometimes necessary to process a query for all rows in which the value of a particular column is within a range of values. Using the aforementioned approach, it would be necessary to determine what possible values are within the range, traverse the tree to obtain the bitmap for each individual value within the range, and perform an "and" operation on each of the resulting bitmaps to obtain a final result bitmap. This operation is particularly inefficient for large value ranges, and requires a large number of traversals through the tree.

Accordingly, what is desired is a means of efficiently processing queries that comprise range conditions.

SUMMARY OF INVENTION

Embodiments of the invention include a method for optimizing a range-based query on a table in a database system. The method includes the steps of receiving the range-based query, the query requesting a set of result rows wherein values of a column of the result rows is within the range, traversing a data structure to locate a first bitmap for a first end of the range, traversing a data structure to locate a second bitmap for a second end of the range, performing a bitmap subtraction on the first bitmap and second bitmap to obtain a result bitmap, and retrieving the set of result rows responsive to the query, the set of result rows based on the result bitmap, wherein the first bitmap, second bitmap, and result bitmap are a set of bits representing whether the column for each row of the table in the database system meets a range condition.

Embodiments of the invention additionally include a computer program product comprising a computer usable medium having computer program logic recorded thereon for enabling a processor to optimize a range-based query on a table in a database system. The computer program logic includes receiving means for enabling a processor to receive the range-based query, the query requesting a set of result rows wherein values of a column of the result rows is within the range, first traversing means for enabling a processor to traverse a data structure to locate a first bitmap for a first end of the range, second traversing means for enabling a processor to traverse a data structure to locate a second bitmap for a second end of the range, performing means for enabling a processor to perform a bitmap subtraction on the first bitmap and second bitmap to obtain a result bitmap, and retrieving means for enabling a processor to retrieve the set of result rows responsive to the query, the set of result rows based on the result bitmap, wherein the first bitmap, second bitmap, and result bitmap are a set of bits representing whether the column for each row of the table in the database system meets a range condition.

Embodiments of the invention further include a system capable of optimizing a range-based query on a table in a database system. The system includes a first module to receive the range-based query, the query requesting a set of result rows wherein values of a column of the result rows is within the range, a second module to traverse a data structure to locate a first bitmap for a first end of the range, a third module to traverse a data structure to locate a second bitmap for a second end of the range, a fourth module to perform a bitmap subtraction on the first bitmap and second bitmap to obtain a result bitmap, and a fifth module to retrieve the set of result rows responsive to the query, the set of result rows based on the result bitmap, wherein the first bitmap, second bitmap, and result bitmap are a set of bits representing whether the column for each row of the table in the database system meets a range condition.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 6C illustrates an example database table, in accordance with an embodiment of the present invention.

Figure 1:
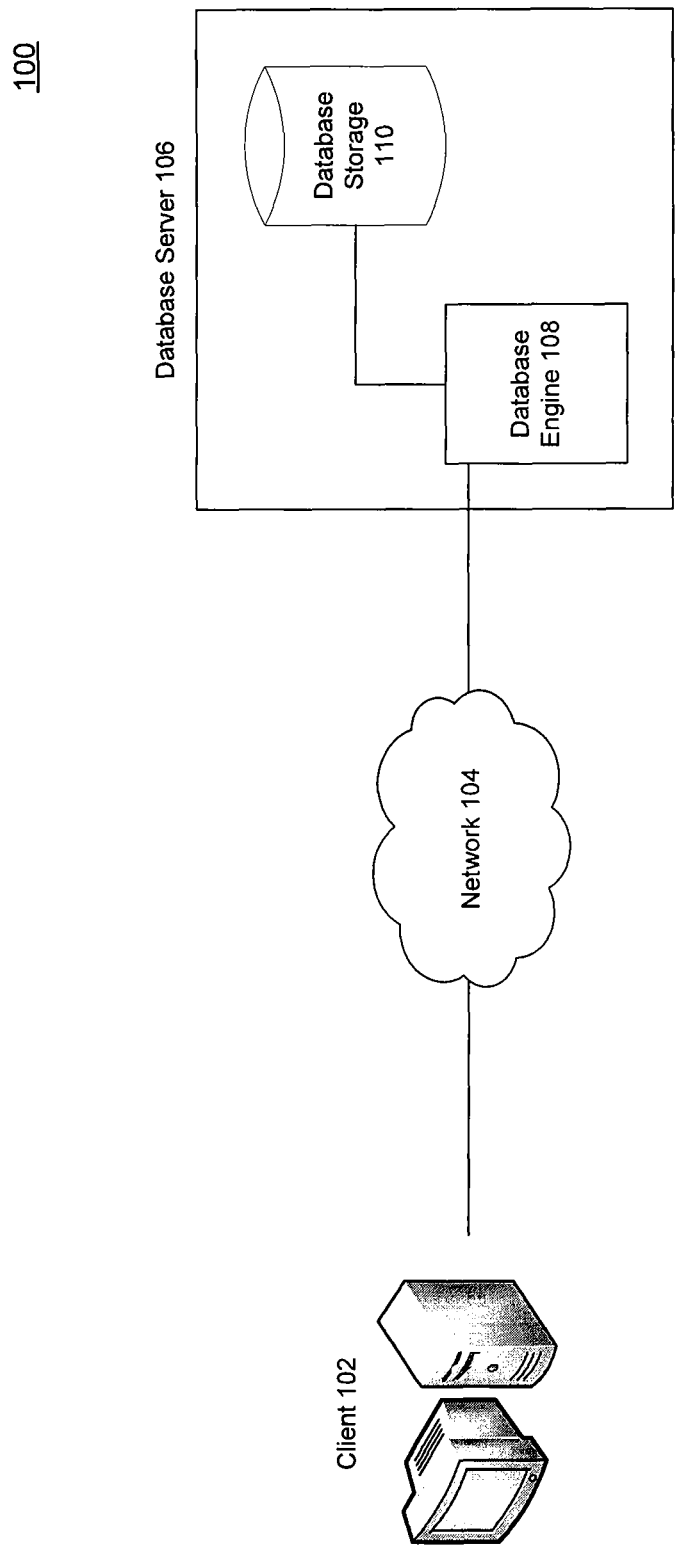
FIG. 1 illustrates a database network in which the present invention is implemented, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

FIG. 1 depicts a database network 100 in which the present invention is implemented, in accordance with an embodiment of the present invention. The database network 100 includes a client system 102, a network 104, and a database server 106. The database server 106 includes a database engine 108 and database storage 110.

Client system 102 is operable to send a request for data, commonly in the form of a database query, to database server 106 over network 104. Database server 106 replies to the request by sending a set of results, commonly in the form of result rows from a database table, to client system 102 over network 104. One skilled in the relevant arts will appreciate that any data format operable to convey a request for data and a reply to the request may be used. In accordance with an embodiment of the present invention, the requests and replies are consistent with the conventions used in the Structured Query Language ("SQL"), although this example is provided solely for purposes of illustration and not limitation.

Network 104 is optionally either a public or private communications network. In accordance with an embodiment of the present invention, network 104 is the Internet. In accordance with an additional embodiment of the present invention, network 104 is a private intranet, such as a corporate network.

When a request for data, such as a query, is received by database server 106, it is handled by database engine 108, in accordance with an embodiment of the present invention. Database engine 108 is operable to determine the data requested by the query, obtain the data, and provide a reply to the query. One skilled in the relevant arts will appreciate that while database engine 108 is illustrated as a single module in database network 100, database engine 108 may be implemented in a number of ways in order to accomplish the same function, including separating each of the aforementioned operations performed by database engine 108 into individual modules. Accordingly, the illustration of modules in database server 106 is not a limitation on the implementation of database server 106.

Database engine 108 is operable to obtain the data in response to the query from database storage 110, in accordance with an embodiment of the present invention. Database storage 110 stores values of a database in a data structure. In accordance with an embodiment of the present invention, database values are stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 108 and client system 102 to interpret data contained in a data cell corresponding to the column. In accordance with an embodiment of the present invention, the database comprises multiple tables.

Additionally, database storage 110 comprises alternate means of indexing data stored in a table of a database, in accordance with an embodiment of the present invention. Database engine 108 is operable to analyze a query to determine whether an available alternate means is useful to optimally access the data stored in a table, then utilizes this alternate means to obtain data from the table, in accordance with an embodiment of the present invention. The present invention is usable as such an alternate means of indexing data stored in a database table, although one skilled in the relevant arts will appreciate that alternate means of invoking the algorithms disclosed herein in order to access data within a database are within the scope of the present invention.

II. Bitmap Tree

Figure 2:
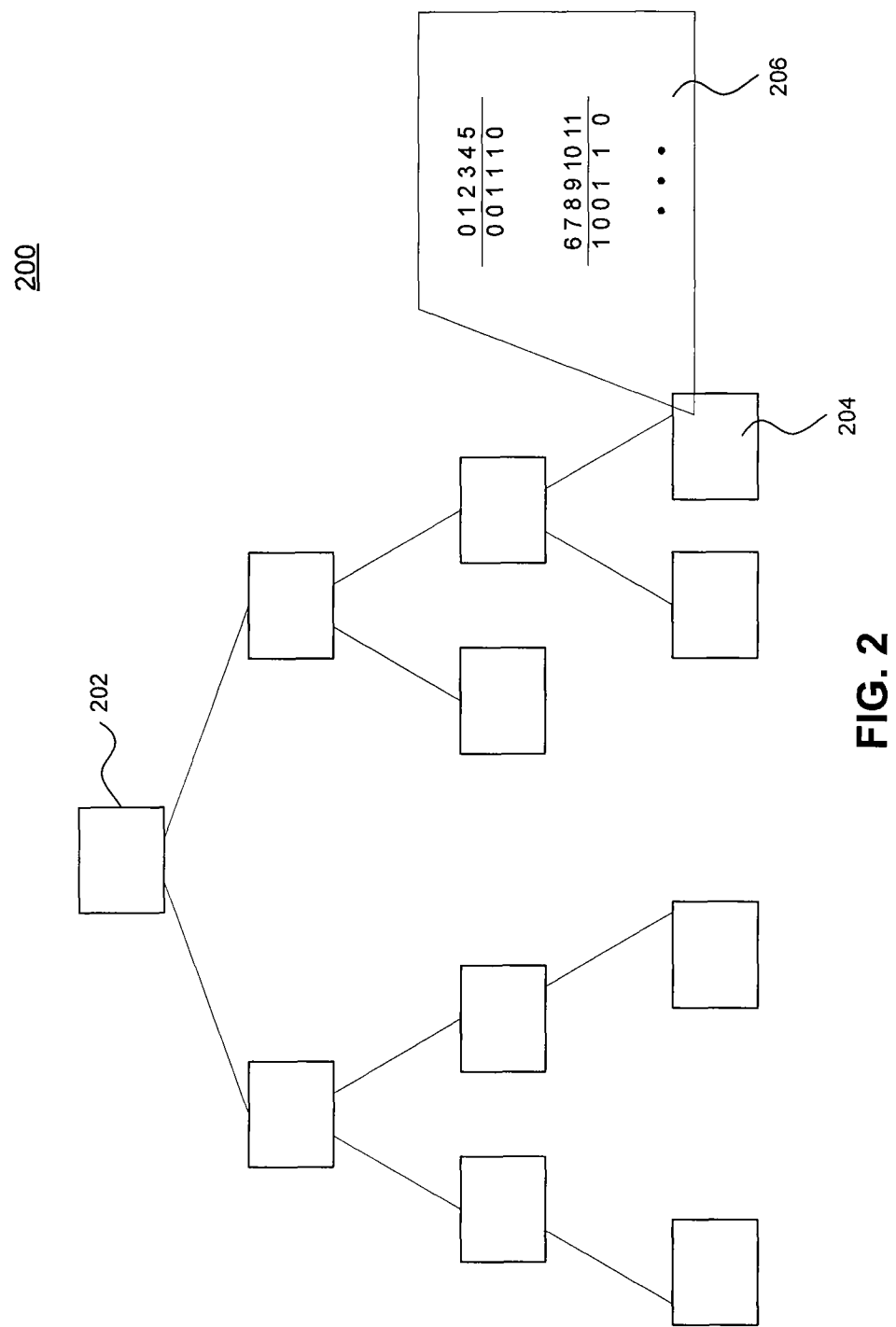
FIG. 2 illustrates a data structure used to provide an alternate means of indexing data in a database table, in accordance with an embodiment of the present invention.

FIG. 2 depicts a data structure 200 used to provide an alternate means of indexing data in a database table, in accordance with an embodiment of the present invention. Data structure 200 is depicted as a binary search tree ("BST"), but one skilled in the relevant arts will appreciate that the present invention is optionally implemented with the use of other types of tree structures, as well as other types of non-tree data structures.

Data structure 200 includes a number of nodes, such as root node 202 and leaf node 204, in accordance with an embodiment of the present invention. Data structure 200 is traversed by database engine 108, in accordance with an embodiment of the present invention, in order to locate a node corresponding to a data value in a query. Each node identifies rows in a database table for which a particular column of that row (i.e., a cell) contains the requested value. For example, if database engine 108 receives a query for all of the data in each row where "column A" has a value of '5' in a table, database engine 108 is operable to retrieve a data structure, such as data structure 200, corresponding to "column A", and is then further operable to traverse the data structure in order to locate a node corresponding to the value of '5' for that column, in accordance with an embodiment of the present invention. The located node includes information identifying the specific rows in the table where the value of "column A" is '5', thereby eliminating the need for database engine 108 to traverse each row of the table in order to compare the entries of "column A".

In accordance with an embodiment of the present invention, each node comprises a bitmap 206. The bitmap 206 is an array of bits wherein each bit of the bitmap is associated with a row of a table. The individual bits of the bitmap are toggled between '0' and '1' to indicate whether or not a particular row meets the condition associated with the node in which bitmap 206 is located, in accordance with an embodiment of the present invention. For the purposes of example, a bit having a value of '0' is used to indicate that the node condition is not met for the associated row, and a bit having a value of '1' is used to indicate that the node condition is met for the associated row, but one skilled in the relevant arts will appreciate that the alternate condition may be used.

In the above example, if node 204 is associated with the condition whereby "column A" has a value of '5', then bitmap 206 indicates that rows 2, 3, 4, 6, 9, and 10 each have a value of '5' in the cell associated with "column A", in accordance with an embodiment of the present invention. Accordingly, the query is rapidly resolved by returning only rows 2, 3, 4, 6, 9, and 10 as a result, without the need to retrieve and compare data in the remaining rows.

The present invention proposes an alternative interpretation to the data in bitmap 206, which is discussed further in Section III.

III. Bitmap Range Conditions

A range condition is defined as a stipulation that values can meet the range condition by meeting any one of one or more individual conditions bounded by two endpoints, in accordance with an embodiment of the present invention. For example, a range condition present in a query can be used to request all rows in which "column A" has a value between '7' and '10', inclusive.

In accordance with an embodiment of the present invention, each bitmap 206 defines an open-ended range bound on one end by a value associated with the node, such as node 204, that contains the bitmap 206. An example of an open-ended range is "the set of all values less than or equal to '10'". Open-ended ranges can be defined in this manner as being either greater than or less than a value associated with a node, and inclusive or non-inclusive of the value, in accordance with an embodiment of the present invention. Although integer values are used throughout this disclosure, one skilled in the relevant arts will appreciate that comparison operations, such as "less than" or "greater than or equal to", can be defined for any data set of any data type, and integers are therefore only used by way of illustration and not limitation.

Figure 3:
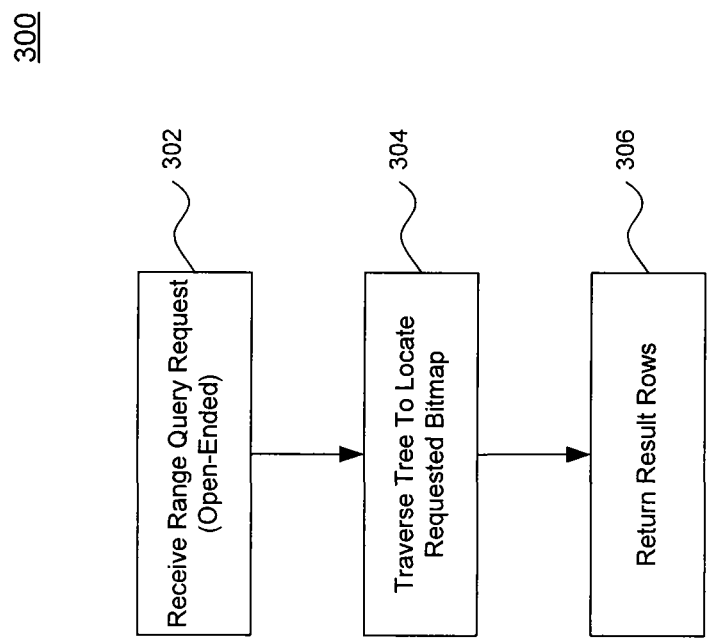
FIG. 3 is a flowchart illustrating steps by which a database server is operable to handle an "open-ended" range request, in accordance with an embodiment of the present invention.

FIG. 3 is a flowchart 300 illustrating steps by which a database server, such as database server 106 of FIG. 1, is operable to handle an "open-ended" range request, in accordance with an embodiment of the present invention. At step 302, a range query is received by database server 106 at database engine 108, in accordance with an embodiment of the present invention. For example, the query may be a request for "all rows in table A where column B<='10'". At step 304, a data structure, such as data structure 200 of FIG. 2 (e.g., a tree structure), is traversed to locate a bitmap, such as bitmap 206, associated with the requested value, such as '10' in the above example. In accordance with an embodiment of the present invention, node 204 is associated with the value '10' as in the example, and bitmap 206 represents all rows in "table A" where "column B" has a value less-than-or-equal-to '10'. At step 306, database engine 108 returns each of the rows indicated by a '1' in bitmap 206 as a result row, thereby answering the query, in accordance with an embodiment of the present invention.

As previously noted, bitmap 206 is not limited to indicating rows having a value less-than-or-equal-to the value of the associated node, and may instead, or concurrently, comprise a bit array indicating rows meeting other range conditions, such as less-than, greater-than-or-equal-to, or greater-than, in accordance with an embodiment of the present invention. The use of these range conditions to reply to more complex queries is further detailed in Section IV.

IV. Range Queries Using Bitmap Range Conditions

Figure 4:
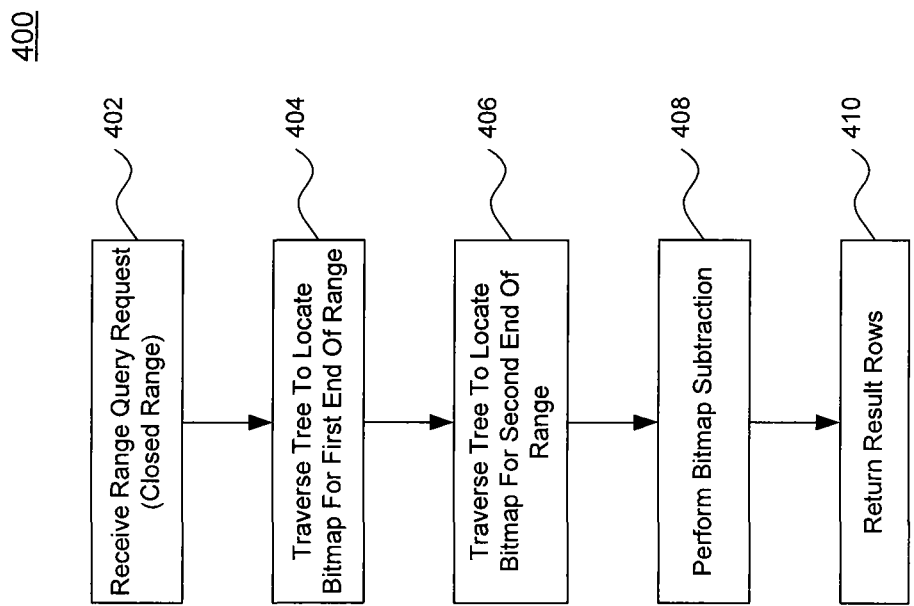
FIG. 4 is a flowchart illustrating steps by which a database server is operable to handle a "closed" range request, in accordance with an embodiment of the present invention.

FIG. 4 is a flowchart 400 illustrating steps by which a database server, such as database server 106 of FIG. 1, is operable to handle a "closed" range request, in accordance with an embodiment of the present invention. At step 402, a range query is received by database server 106 at database engine 108, in accordance with an embodiment of the present invention. For example, the query may be a request for "all rows in table A where the value of column B is between '7' and '10', inclusive".

For this example, it is assumed that bitmaps, such as bitmap 206 of FIG. 2, are accessed in a tree structure such as data structure 200. Furthermore, it is assumed that the bitmap 206 represents the set of rows in "table A" where the value of "column B" is less-than-or-equal-to the value associated with a node, such as node 204. One skilled in the relevant arts will appreciate, however, that a number of data structures may be used instead of data structure 200 in order to access bitmaps, and that other conditions can be defined by bitmap 206 in order to achieve a similar result.

At step 404, the tree 200 is traversed to locate a first bitmap, such as bitmap 206 for the first end of the range, in accordance with an embodiment of the present invention. In the example, this would be the bitmap associated with the value '10', thereby obtaining a listing of all rows in "table A" where the value of "column B" is less-than-or-equal-to '10'.

At step 406, the tree 200 is again traversed to locate a second bitmap for the second end of the range, in accordance with an embodiment of the present invention. Since the value '7' is to be included in the query results, and the bitmaps give results for values less-than-or-equal-to a node value, database engine 108 is operable to recognize that the bitmap for the next value, in this case '6', should be obtained, in accordance with an embodiment of the present invention.

At step 408, a bitmap subtraction is performed in order to obtain a result bitmap, the result bitmap having a bit set only for those rows in "table A" where the value of "column B" is between '7' and '10', inclusive, in accordance with an embodiment of the present invention. Specifically, each of the bits of the bitmap for '6' is subtracted from each of the bits of the bitmap for '10' in the example.

At step 410, the result rows for the query are returned, in accordance with an embodiment of the present invention. This is accomplished by consulting the database tables, such as those contained in database storage 110 of FIG. 1, and retrieving the rows of "table A" associated with each of the bits of the result bitmap where the bit has a value of '1', or whichever value is used to indicate that the associated row meets the range condition. The rows are then formatted into a reply and sent back to the requesting client system 102, in accordance with an embodiment of the present invention.

In accordance with an additional embodiment of the present invention, the range condition occurs as a subpart of a query. In this situation, the range condition is resolved as detailed herein, but the results are retained by a database server, such as database server 106, for additional processing in order to obtain a final result requested in the query.

Figure 5:
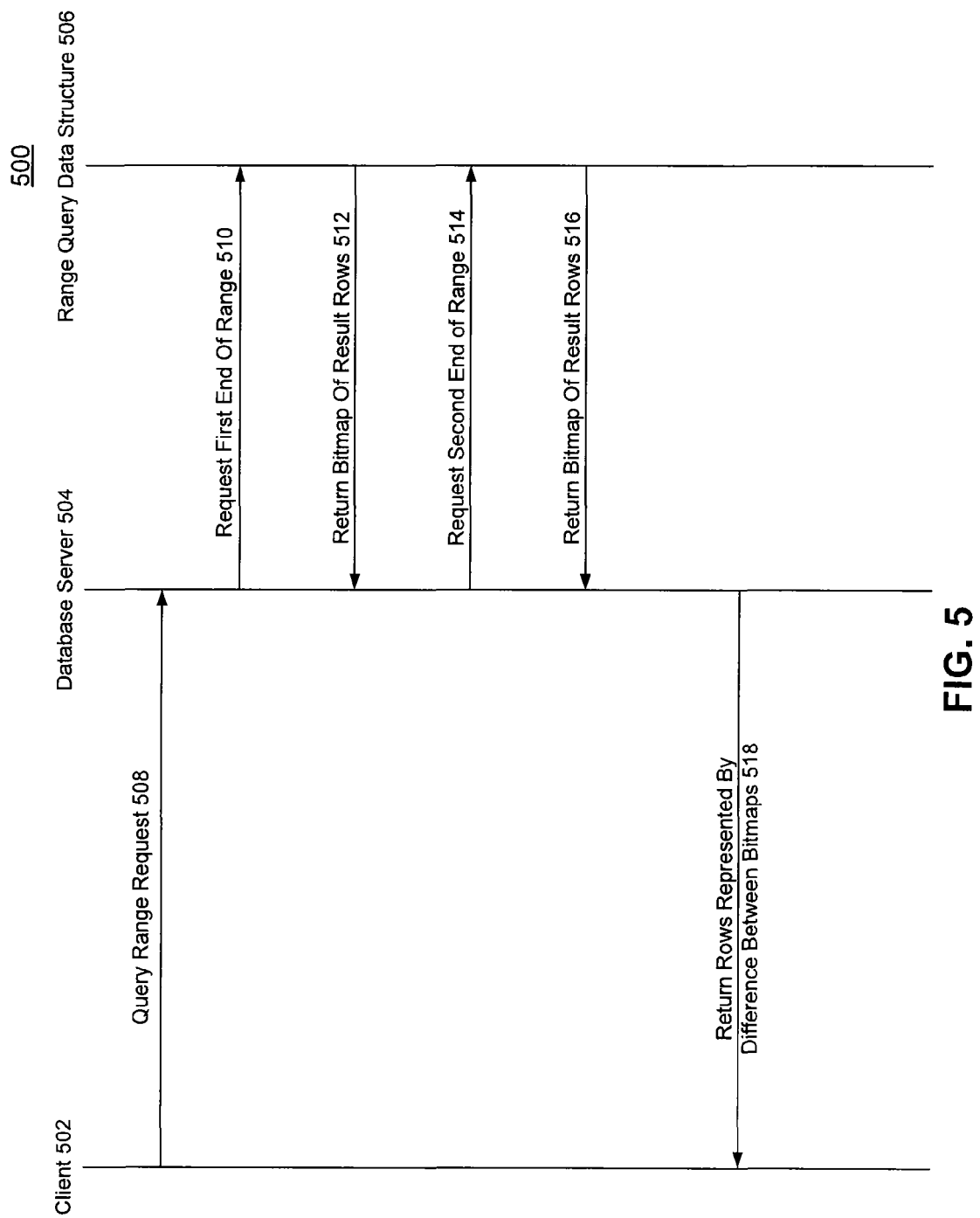
FIG. 5 is a communication flow diagram illustrating communication paths of a client system, a database server, and a range query data structure, in accordance with an embodiment of the present invention.

FIG. 5 is a communication flow 500 illustrating the communication paths of client system 502, database server 504, and range query data structure 506, in accordance with an embodiment of the present invention. In accordance with an additional embodiment of the present invention, range query data structure 506 is a data structure such as data structure 200 of FIG. 2, embodied in a processing module operable to process requests involving the data structure, and may be implemented in either software or hardware.

At step 508, client 502 submits a query range request 508, such as the above example request for rows meeting a condition where the value of a particular column is between '7' and '10', inclusive, in accordance with an embodiment of the present invention. At step 510, database server 504 requests a bitmap associated with the first end of the range from range query data structure 506, and receives the bitmap in a reply 512. At step 514, database server 504 requests a bitmap for the second end of the range, and receives the bitmap in a reply 516. At step 518, database server 504 returns the resulting rows to client 502 by performing a subtraction of the two bitmaps to obtain a result bitmap, and sending the rows associated with the set bits of the result bitmap to client 502.

Figure 6A:
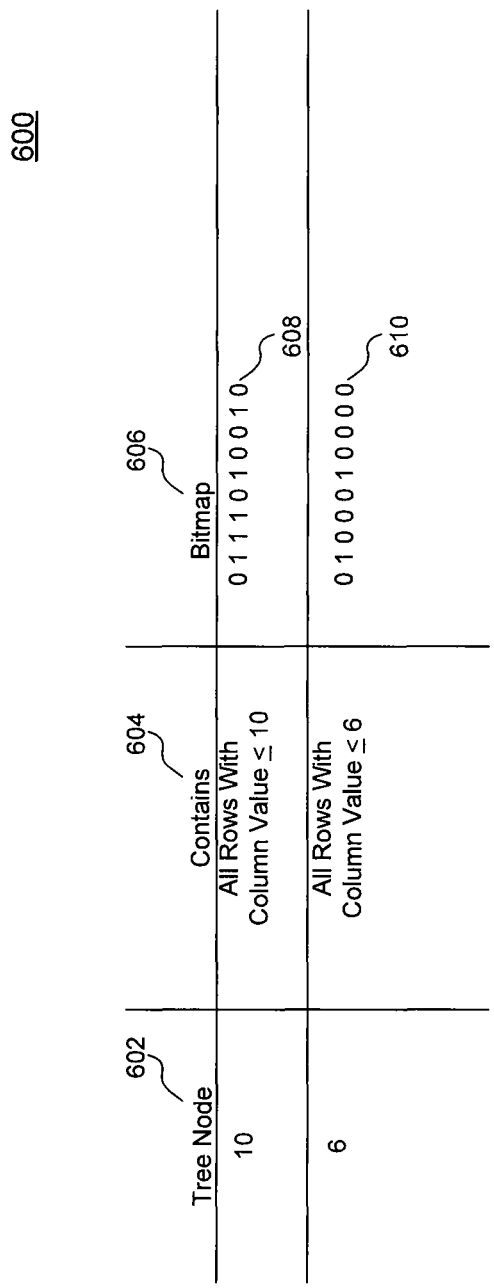
FIG. 6A is a chart detailing representation of nodes used in an example range query, in accordance with an embodiment of the present invention.

FIG. 6A is a chart 600 detailing the representation of the nodes used in the example range query, in accordance with an embodiment of the present invention. Column 602 shows the two nodes involved, those associated with the values '10' and '6', and column 604 details the contents of the bitmap referenced by each of these nodes, in accordance with the example. Specifically, the bitmap of node 10 contains a bitmap where each bit represents a row, and the bit for each row is set to a value of '1' if the corresponding row has a value for "column B" that is less-than-or-equal-to '10', in accordance with an embodiment of the present invention. Similarly, the bitmap of node 6 contains a set bit corresponding to each row where the value of "column B" is less-than-or-equal to '6'.

Figure 6B:
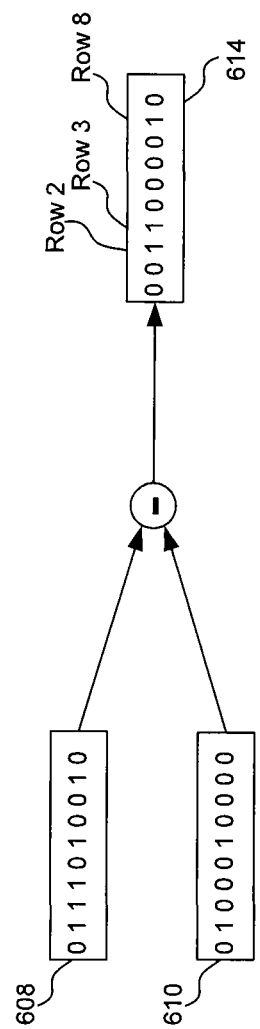
FIG. 6B illustrates bitmap subtraction where a first bitmap is subtracted from a second bitmap to obtain a result bitmap, in accordance with an embodiment of the present invention.

The corresponding bitmaps are shown in column 606, using an example of a table having ten rows, in accordance with an embodiment of the present invention. Bitmap 608 has the bit string $01110100102$, whereas bitmap 610 has the bit string $01000100002$, in this example. FIG. 6B illustrates bitmap subtraction 612 where bitmap 610 is subtracted from bitmap 608 to obtain bitmap 614, having the bit string $00110000102$, in accordance with an embodiment of the present invention.

In the aforementioned example, it is assumed that the leftmost bit of each of the bitmaps 608, 610, and 614 is associated with the $0^{th}$ row of a table, and the right-most bit is thereby associated with the $9^{th}$ row of the table. One skilled in the relevant arts will recognize, however, that each of the bits of the bitmap can be associated in any manner with each of the rows of the table, and the particular association used in this example is used by means of illustration and not limitation.

FIG. 6C illustrates a database table 616 corresponding to the above example, in accordance with an embodiment of the present invention. As noted, each of the ten rows, 0-9, is associated with each of the bits of bit strings 608, 610, and 614 from left-to-right. The column of interest 618 is, as in the above example, "column B", the column being used for the range condition, in accordance with an embodiment of the present invention.

The bitmap for node 10, bitmap 608, has a bit string of $0111010010_2$ because only the values of column 618 for rows 1, 2, 3, 5, and 8 have a value of less-than-or-equal to '10', consistent with the above example. The bitmap for node 6, bitmap 610, has a bit string of $0100010000_2$ because only the values of column 618 for rows 1 and 5 have a value of less-than-or-equal to '6', consistent with the above example.

Performing the bitmap subtraction results in bitmap 614, having a bit string of $0011000010_2$, in accordance with the example. This indicates that the values of column 618 for rows 2, 3, and 8 are the only ones in the range of '7' to '10', inclusive, which is consistent with the values shown in table 616.

V. Advanced Range Queries

Utilizing bitmaps of open-ended range conditions, a number of queries can be optimized by eliminating the need for costly comparisons directly with every single row of a database table. The following are examples of such queries.

In an example, bitmaps such as bitmap 206 indicate those rows in a table where the value of a column of that row is less-than-or-equal-to a value associated with the bitmap, such as the value of a node containing the bitmap. A query requests all rows having values for a particular column greater than a value 'X'. In accordance with an embodiment of the present invention, a database engine 108 is operable to obtain a bitmap associated with the next lowest value after 'X', invert the bitmap to generate a result bitmap, and return rows indicated by bits of the result bitmap as meeting the condition.

In an additional example, bitmaps such as bitmap 206 indicate those rows in a table where the value of a column of that row is less-than-or-equal-to a value associated with the bitmap, such as the value of a node containing the bitmap. A query requests all rows having values for a particular column that are not within a range 'X' to 'Y', inclusive. In accordance with an embodiment of the present invention, a database engine 108 is operable to obtain a bitmap associated with the highest of 'X' or 'Y', subtract a bitmap associated with the next lowest value after the lowest of 'X' or 'Y', invert the bitmap to generate a result bitmap, and return rows indicated by bits of the result bitmap as meeting the condition.

In a further example, bitmap operations are combined to resolve queries having multiple conditions. In accordance with an example of the present invention, a query requests all rows having values for a first column within the range 'X' to 'Y', and having values for a second column within the range 'A' to 'B'. A database engine 108 is operable to obtain a first result bitmap for the first operation involving the range 'X' to 'Y', and a second result bitmap for the second operation involving the range 'A' to 'B', perform an "and" operation on the first and second result bitmaps to generate a final result bitmap, and return rows indicated by bits of the final result bitmap as meeting the condition.

VI. Example Computer System Implementation

Figure 7:
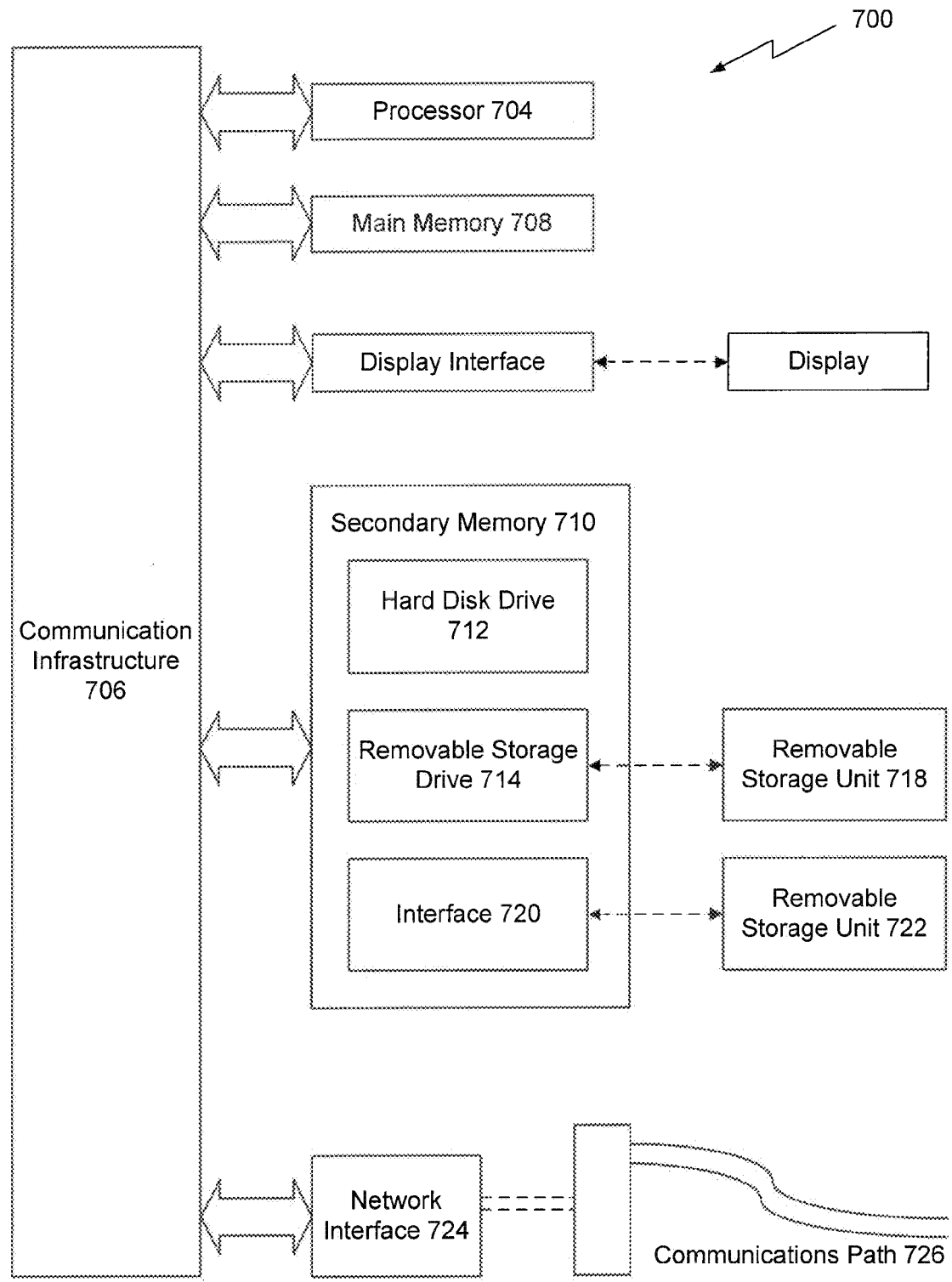
FIG. 7 depicts an example computer system in which embodiments of the present invention may be implemented.

Various aspects of the present invention can be implemented by software, firmware, hardware, or a combination thereof. FIG. 7 illustrates an example computer system 700 in which the present invention, or portions thereof, can be implemented as computer-readable code. For example, the methods illustrated by flowcharts 300 of FIG. 3 and 400 of FIG. 4, as well as communication flow diagram 500 of FIG. 5, can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowcharts 300 of FIG. 3 and 400 of FIG. 4, as well as communication flow diagram 500 of FIG. 5, discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
receiving a range-based query requesting a set of result rows having a column value of a database within a range specified by the query, wherein the range requests the set of result rows either greater than a specified value or less than the specified value;
traversing a data structure to locate a first bitmap of a first node of a data structure corresponding to a first end of the range, wherein the data structure corresponds to an index of data for a column of a database table and comprises a plurality of nodes, each node corresponding to a particular value of the data for the column of the database, and wherein each node comprises a bitmap that indicates which rows of the database include the value,
wherein if the range requests the set of result rows greater than the specified value, the first bitmap corresponds to a next lowest value than the specified value, and
wherein if the range requests the set of result rows less than the specified value, the first bitmap corresponds to a next highest value than the specified value;
inverting the first bitmap to obtain a result bitmap; and
responding to the query with a set of result rows matching the result bitmap,
wherein the first bitmap and the result bitmap comprise sets of bits representing whether the column value is within the range for corresponding rows of a table in a database system.

2. The method of claim 1, wherein if the range requests the set of result rows less than or equal to the specified value, the first bitmap corresponds to the specified value.

3. The method of claim 1, wherein if the range requests the set of result rows greater than or equal to the specified value, the first bitmap corresponds to the specified value.

4. The method of claim 1, wherein the data structure is a tree.

5. The method of claim 1, further comprising:
transmitting the set of result rows to a client system.

6. A non-transitory computer-readable storage device having instructions stored thereon, execution of which, by a computing device, causes the computing device to perform operations comprising:
receiving a range-based query requesting a set of result rows having a column value of a database within a range specified by the query, wherein the range requests the set of result rows either greater than a specified value or less than the specified value;
traversing a data structure to locate a first bitmap of a first node of a data structure corresponding to a first end of the range, wherein the data structure corresponds to an index of data for a column of a database table and comprises a plurality of nodes, each node corresponding to a particular value of the data for the column of the database, and wherein each node comprises a bitmap that indicates which rows of the database include the value,
wherein if the range requests the set of result rows greater than the specified value, the first bitmap corresponds to a next lowest value than the specified value, and
wherein if the range requests the set of result rows less than the specified value, the first bitmap corresponds to a next highest value than the specified value;
inverting the first bitmap to obtain a result bitmap; and
responding to the query with a set of result rows matching the result bitmap,
wherein the first bitmap and the result bitmap comprise sets of bits representing whether the column value is within the range for corresponding rows of a table in a database system.

7. The computer-readable storage device of claim 6, wherein if the range requests the set of result rows less than or equal to the specified value, the first bitmap corresponds to the specified value.

8. The computer-readable storage device of claim 6, wherein if the range requests the set of result rows greater than or equal to the specified value, the first bitmap corresponds to the specified value.

9. The computer-readable storage device of claim 6, wherein the data structure is a tree.

10. The computer-readable storage device of claim 6, the operations further comprising:
transmitting the set of result rows to a client system.

11. A system comprising:
a memory configured to store modules comprising:
a first module configured to a range-based query requesting a set of result rows having a column value of a database within a range specified by the query, wherein the range requests the set of result rows either greater than a specified value or less than the specified value,
a second module configured to traverse a data structure to locate a first bitmap of a first node of a data structure corresponding to a first end of the range, wherein the data structure corresponds to an index of data for a column of a database table and comprises a plurality of nodes, each node corresponding to a particular value of the data for the column of the database, and wherein each node comprises a bitmap that indicates which rows of the database include the value,
wherein if the range requests the set of result rows greater than the specified value, the first bitmap corresponds to a next lowest value than the specified value, and
wherein if the range requests the set of result rows less than the specified value, the first bitmap corresponds to a next highest value than the specified value
a third module configured to invert the first bitmap to obtain a result bitmap and
a fourth module configured to respond to the query with a set of result rows matching the result bitmap; and
one or more processors configured to process the modules,
wherein the first bitmap and the result bitmap comprise sets of bits representing whether the column value is within the range for corresponding rows of a table in a database system.

12. The system of claim 11, wherein if the range requests the set of result rows less than or equal to the specified value, the first bitmap corresponds to the specified value.

13. The system of claim 11, wherein if the range requests the set of result rows greater than or equal to the specified value, the first bitmap corresponds to the specified value.

14. The system of claim 11, wherein the data structure is a tree.

15. The system of claim 11, further comprising:
a fifth module configured to transmit the set of result rows to a client system.

16. The method of claim 1, wherein if the range-based query requests the set of result rows not within the range, the first bitmap is the result bitmap.

* * * * *